Jan. 20, 1959  R. C. BAIRD  2,869,962
SELF-SYNCHRONIZING HORSE POWER INDICATOR
Filed April 21, 1952  2 Sheets-Sheet 1

RAYMOND C. BAIRD,
INVENTOR.

BY

ATTORNEY.

Jan. 20, 1959
R. C. BAIRD
2,869,962
SELF-SYNCHRONIZING HORSE POWER INDICATOR
Filed April 21, 1952
2 Sheets-Sheet 2
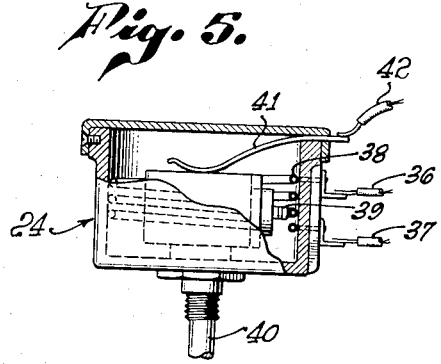
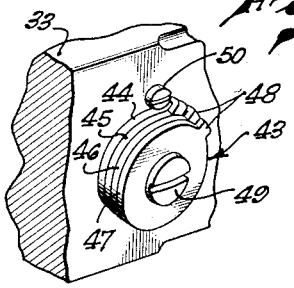
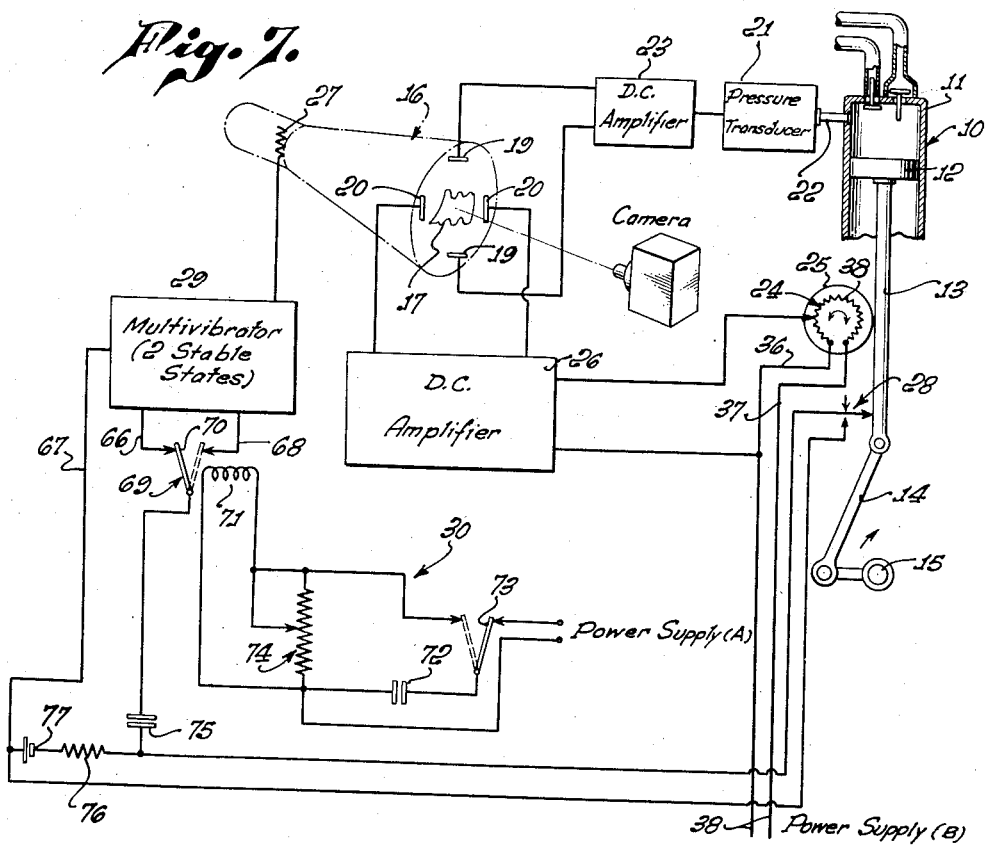
INVENTOR.
RAYMOND C. BAIRD,
BY
ATTORNEY.

United States Patent Office 2,869,962
Patented Jan. 20, 1959

2,869,962

SELF-SYNCHRONIZING HORSE POWER INDICATOR

Raymond C. Baird, Los Angeles, Calif., assignor to The Fluor Corporation, Ltd., Los Angeles, Calif., a corporation of California Application April 21, 1952, Serial No. 283,407

15 Claims. (Cl. 346—4)

This invention relates to improved indicating apparatus for producing a pressure diagram or curve representing a cycle of pressures of a piston and cylinder mechanism, such as a compressor or reciprocating type engine. More particularly, the invention is especially concerned with means for rendering such indicating apparatus accurately responsive to the piston movements, to form a curve representing pressures plotted against piston displacement.

For actuating an indicator, such as an oscilloscope, in accordance with piston displacement, it is customary to employ a control device which is driven by the crankshaft of the piston and cylinder mechanism, and which acts to produce a signal oscillating in correspondence with the reciprocation of the piston. This signal is then employed to control the actuation of the indicator along one of its axes. While such crankshaft driven devices are satisfactory in some respects, they have one definite disadvantage in that they require individual synchronization with each piston with which they are used, in order to assure that the oscillations of the output signal will accurately correspond to the reciprocation of the piston. This synchronization often proves to be a rather difficult and time consuming procedure.

The general object of the present invention is to provide a pick-up device for controlling the actuation of an indicator in accordance with piston displacement, and which is self-synchronizing, so that the output signal is always automatically synchronized with and proportional to the piston displacement. This pick-up device differs from conventional expedients in being directly driven by a reciprocating part of the piston and cylinder mechanism, preferably the piston rod, rather than by the rotating crank shaft. More specifically, the pick-up device includes a movable member which is directly and usually frictionally engageable with the rod or other reciprocating part, to move in exact accordance with the part. This member preferably takes the form of a roller or wheel mounted to a portable handle body for rotary oscillation in accordance with reciprocation of the piston rod. The roller or other pick-up element controls the operation of an indicator, such as an oscilloscope, through a suitable control unit, such as a potentiometer, which may be carried by the same handle body as the roller. The control unit is such as to effect movement of the indicator along one of its axes in accordance with and in exact proportion to the movement of the wheel or pick-up element with the piston rod.

To assure a positive frictional and non-slipping drive of the pick-up element, the rod engaging surface of this element may be formed of a suitable friction material. Of numerous friction materials which I have tested for this purpose, the most satisfactory has been foam rubber.

Where the indicator is of a recording type, adapted to produce a permanent graphical record of the cylinder pressures, as where a camera is employed for photographing the face of an oscilloscope, it is often desirable to limit the operation of the recorder to a predetermined number of cycles, usually a single cycle. A particular object of the present invention is to provide means operable in such a case to automatically limit the indication to the desired number of cycles. For this purpose, I prefer to employ a unique control switch which may be carried by the same body as the rod engaging wheel or member, and which is actuable in accordance with reversals in the direction of motion of the rod. In conjunction with this switch I employ means operable by the signals given upon actuation of the switch to start an indicating cycle upon one switch actuation and stop the cycle upon a subsequent actuation. Desirably, these switch operated means include a conventional two state multivibrator, and a suitable electric control circuit for actuating the multivibrator in accordance with the switch actuations.

Structurally, the switch for responding to reversals of piston movement may include an element frictionally engageable with the piston rod or other reciprocating part, and free for limited circuit opening and closing movements in response to reversals in the direction of movement of the rod. This rod engaging element may also be free for movement (relative to the carrying handle body) toward and away from the engaged rod, a feature which is particularly important for assuring most effective engagement of any of different size rods by the pick-up wheel and switch element.

The above and other features and objects of the present invention will be better understood from the following detailed description of the typical embodiment illustrated in the accompanying drawings, in which:

Fig. 5 is an enlarged partly sectional view of the rotary potentiometer of the Fig. 1 unit;

Fig. 6 is an enlarged fragmentary perspective view of the rotation limiting stop elements of Figs. 1 and 2; and Fig. 7 is a diagrammatic representation of an oscilloscope control circuit employing the piston rod engaging unit of Figs. 1 to 6.

Figure 1:
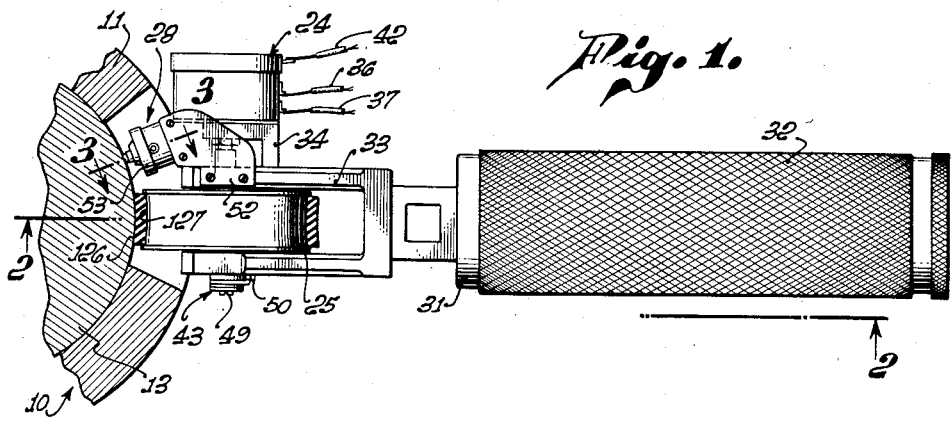
Fig. 1 is a view of a portable unit for engaging a piston rod and controlling the operation of an oscilloscope in accordance with the piston rod movements.
Figure 2:
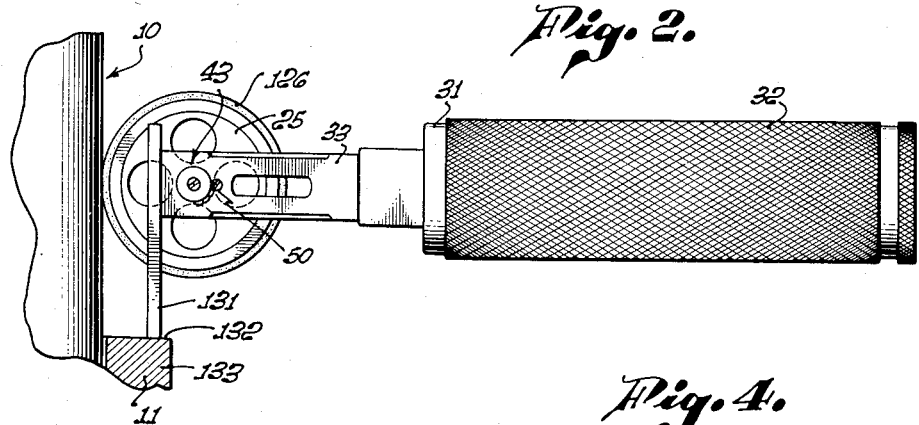
Fig. 2 is a view of the Fig. 1 device taken on line 2—2 of Fig. 1.

Referring first to the Fig. 7 diagram, I have represented at 10 a piston and cylinder mechanism whose pressure cycle is to be indicated. This mechanism includes a cylinder 11, a piston 12, a piston rod 13, and a connecting rod 14 for connecting the piston rod to crack shaft 15. Designated at 16 is a conventional oscilloscope, which acts to produce on its face a graph or diagram 17 representing a cycle of cylinder chamber pressures in the piston and cylinder mechanism. A camera is mounted opposite the face of the oscilloscope, to photograph and thereby make a permanent record of the graph 17.

To cause the oscilloscope to produce a pressure diagram, the potentials on its vertical deflection plates 19 are caused to vary in accordance with variations in the cylinder chamber pressure, while the potentials of the horizontal deflection plates 20 vary in proportion to the piston displacement. More specifically, the potentials of the vertical deflection plates 19 are controlled by a pressure transducer, which communicates with the cylinder chamber through a line 22, and acts to produce an electrical control signal whose voltage varies in accordance with variations in the cylinder chamber pressure. A direct current amplifier 23 is employed for amplifying the pressure controlled voltage to a value sufficient to vertically displace the electron beam within oscilloscope 16.

The potentials of horizontal deflection plates 20 vary in accordance with the actuation of a rotary potentiometer 24 which is driven by a wheel 25 frictionally engaging piston rod 13. The varying output voltage of potentiometer 24 is amplified by a D. C. amplifier 26 before application to oscilloscope plates 20.

The starting and stopping of an indicating operation by the oscilloscope is controlled by variation of the potential applied to a grid 27 positioned along the path of the electron beam within the oscilloscope. As will be appreciated, the application of a negative potential of a predetermined value to grid 27 stops the flow of electrons and thus turns the oscilloscope image off. The energization of grid 27 is controlled automatically in a manner limiting an indication by the oscilloscope to a predetermined number of cycles, usually one. For this purpose, I employ grid control apparatus including a switch 28 engaging piston rod 13 and actuated by it in response to reversals in the direction of rod movement, a conventional multivibrator unit 29 of the type having two-stable states, and a time delay control circuit 30.

To facilitate the making of a pressure diagram with the present apparatus, the piston rod actuated pick-up wheel 25, potentiometer 24, and switch 28 are preferably all mounted to a common portable body, to form a single unit easily movable by an operator into and out of engagement with the rod. This unit is shown in Figs. 1 to 6, in which the body of the device is shown at 31. This body may be of the illustrated elongated configuration, and have a handle portion 32 by which an operator grips the unit for moving it into engagement with the piston rod 13.

At one end, body 31 has a yoke portion 33, between whose arms is rotatably mounted the rod driven wheel 25. To prevent any slippage between rod 13 and wheel 25, the wheel may carry an outer rod-engaging ring 126 of a friction material having a higher coefficient of friction than the body of the wheel. Foam rubber has proven to be the most satisfactory friction material for this purpose. As seen in Fig. 1, the radially outer surface 127 of the wheel body 25 is slightly curved in correspondence with the outer surface of one size piston rod 13 which is expected to be encountered, and the friction ring 126 is similarly curved to assure a most effective frictional engagement with the rod. As will be appreciated, axial reciprocation of piston rod 13 during operation of the piston and cylinder mechanism causes a rotary oscillation of wheel 25 in exact accordance with the piston reciprocation, by virtue of the direct frictional drive between the piston rod and wheel. To facilitate maintenance of body 31 in fixed position relative to the cylinder during a recording operation, the body may have an integral projection 131 extending axially of the piston and cylinder mechanism beyond the periphery of wheel 25, and adapted to engage and be positioned by a transverse shoulder 132 on the piston rod bushing 133.

The rotary potentiometer 24 is mounted to body 31 in axial alinement with wheel 25, by a mounting bracket 34 attached to one of the arms of body yoke 33. This potentiometer is preferably of a type adapted for rotation through several complete revolutions before reaching the limit of its travel. To permit such multiple turn operation, the potentiometer may include a helically wound resistance element 38, as seen in Fig. 5. The opposite ends of this resistance element are connected through leads 36 and 37 to power supply lines 38. A movable contact 39 of the potentiometer advances helically along the resistance element in accordance with rotation of the potentiometer drive shaft 40. Moving contact 39 of the potentiometer is connected through a spring finger 41 to a lead 42, which is connected to the D. C. amplifier for controlling the potential of the oscilloscope horizontal deflection plates. Control shaft 40 of the potentiometer extends through the center of wheel 25, and is keyed to the wheel to effect rotation of the potentiometer in exact accordance with the wheel. By virtue of this direct connection between the wheel and potentiometer, the potential between leads 42 and 36, oscillates in accordance with the reciprocation of rod 13 and is proportional to the displacement of rod 13. Consequently, the oscilloscope is deflected horizontally in exact accordance with the piston rod movements.

Suitable means are provided for limiting the rotation of wheel 25 and potentiometer 24 to the number of turns for which the potentiometer is adapted. For this purpose, I may employ a stop assembly 43 comprising a number of axially adjacent relatively rotatable disc-like elements 44, 45, 46 and 47 mounted about the end of shaft 34 at a side of body yoke 33 opposite that at which the potentiometer is carried. Each of these disc-like elements except the innermost one 44 (which acts merely as a spacer) has an integral axially inwardly turned rotation-limiting gear. The outermost disc 47 is fastened rigidly to the end of shaft 40 by a screw 49, to rotate with the shaft. The other discs are free for individual rotation relative to and about shaft 40.

The inner one of the ears or lugs 48 is engageable with a stop screw 50 mounted to body yoke 33, to limit the rotation of the corresponding disc element 45 to a single revolution relative to the body. The ear of the next outer disc 46 is engageable with the ear of disc 45 to limit relative rotation between these two discs to a single revolution. Similarly, the ears of discs 46 and 47 are engageable to limit the relative rotation of those discs to a single revolution. As will be appreciated, such a disc assembly acts to limit the rotation of the shaft 40 and its carried parts to a number of revolutions corresponding to the number of eared discs which are employed. The typically illustrated arrangement in which three such discs are provided would limit the rotation of the shaft to three revolutions, and would be used where the range of movement of potentiometer 24 is three revolutions.

Figure 3:
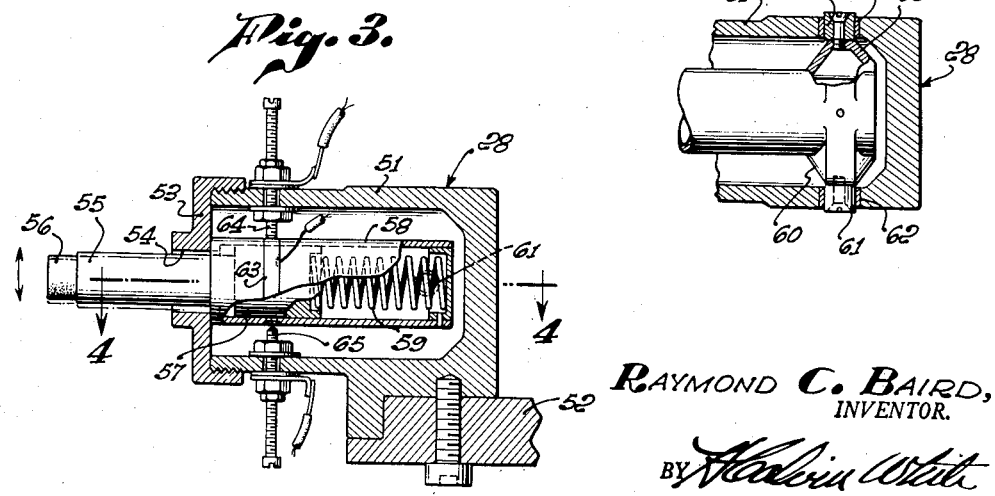
Fig. 3 is an enlarged fragmentary section through the switch of the Fig. 1 device for responding to reversals in the direction of piston rod movement, and taken along line 3—3 of Fig. 1.
Figure 4:
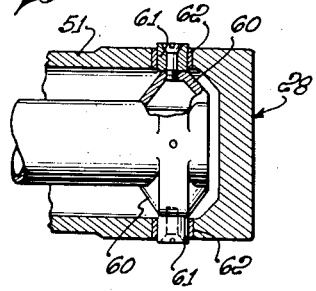
Fig. 4 is a fragmentary section view taken on line 4—4 of Fig. 3.

Referring now to Figs. 1, 3 and 4, the switch 28 for responding to reversals in the direction of movement of the piston rod includes a cylindrical housing 51 mounted at a side of wheel 25 to a bracket 52 carried by body yoke 33. Switch housing 51 has a cap 53 at an inner end facing the piston rod, through an opening 54 in which an elongated actuating pin or stem 55 projects. Stem 55 carries at its inner end a tip 56 formed of friction material, preferably foam rubber, frictionally engaging and responding to movements of rod 13. As seen best in Fig. 3, the cap opening 54 through which stem 55 extends has a slightly greater dimension than the stem in the direction of piston rod movement to permit slight lateral movement of the stem in that direction relative to the cap and switch housing, that is, between the full-line and broken-line positions of Fig. 3. Stem 55 is also free for axial movement toward and away from rod 13, to permit its accommodation to different diameter rods.

To mount stem 55 for such lateral and axial movement, the stem is provided at a location within housing 51 with an enlarged inner cylindrical head 57, which is guided for axial movement within a tubular barrel 58. Spring 59 within the barrel urges the actuating stem axially outwardly into frictional engagement with the piston rod. At the end of barrel 58 opposite the end from which stem 55 projects, the barrel is mounted for pivotal movement relative to the switch housing, to permit the desired lateral movement of rod engaging stem 55. This pivotal mounting of the barrel and stem is effected by shaping the end of the barrel to form a pair of oppositely directed lateral projections 60, to which are mounted a pair of short cylindrical pins or shaft sections 61 journalled within bearings 62 in the switch housing wall.

As will be appreciated, the pivotal mounting of barrel 58 and stem 55 is such that the stem swings in the same direction that the rod engaging portion of wheel 25 moves. Also, the switch is so mounted that the axial movement of the stem is in a direction directly toward and away from the outer rod surface. Stated differently, the axial movement of stem 55 is in a direction extending radially of a cylindrical rod 13 having a surface curvature corresponding to the transverse curvature of friction element 26 on the wheel, and engaging that friction element.

For opening and closing a circuit or circuits in accordance with lateral movements of switch stem 55, the barrel 58 carries a ring contact 63, which is engageable with housing carried contacts 64 and 65 in the two positions respectively of the stem and barrel. As the piston rod is moving in one direction, it moves switch stem 55 in a corresponding direction to engage one of the contacts 64 or 65 and thus close an electric circuit between external leads connected to the moving contact and that stationary contact. A reversal in the direction of movement of the piston rod actuates the switch stem to open that first circuit and close a second one between the movable contact 63 and the second stationary contact. It will be understood that control circuits for energizing oscilloscope grid 27 may be devised employing either one or two of the stationary contacts. The circuit typically illustrated in Fig. 7 makes use of the switching action between only one of these stationary contacts and the movable contact 63.

Describing now the illustrated typical grid control circuit, the multivibrator unit 29 is of a conventional two-stable state type, having a first stable state in which grid 27 is negatively charged to prevent the passage of electrons to the oscilloscope face, and a second state in which the grid permits the passage of electrons and thus the formation of an image. The multivibrator is actuated to the first of these states, that is, the oscilloscope-off condition by the passage of current through the multivibrator through a circuit including a lead 66 and a lead 67. Actuation of the multivibrator to its second oscilloscope-on condition is effected by passing current through the multivibrator from a circuit including a lead 68 and lead 67. The current for thus actuating the multivibrator is provided by the discharging of a capacitor 75 through a circuit including rod engaging switch 28, which switch closes the circuit during piston rod movement in one direction and opens it during rod movement in a reverse direction. During each period that switch 28 is open capacitor 75 is charged by a battery 77, which is connected into a circuit including a resistor 76 and paralleling switch 28. Upon each closure of switch 28, capacitor 75 discharges in a very short interval through the multivibrator. The multivibrator is sensitive to pulses of only one polarity, specifically the capacitor discharging pulses.

A relay 69 is provided in the multivibrator circuit for selecting which of the two leads 66 or 68 will be energized by the discharging pulses from capacitor 75, to thus determine whether those pulses actuate the vibrator to an oscilloscope on or off condition. The contact arm 70 of relay 69 is normally in its Fig. 7 full-line position, in which pulses coming from the capacitor upon closure of switch 28 actuate the multivibrator to its oscilloscope off state. Energization of the relay coil 71 actuates arm 70 to its broken-line position in which a pulse from capacitor 75 upon closure of switch 28 is effective to actuate the multivibrator to an oscilloscope on state.

The relay coil 71 is energized by the discharge of a capacitor 72. A control switch 73 controls the charging and discharging of capacitor 72, being normally in its full-line Fig. 7 position connecting the capacitor to a power supply A for charging, and being manually actuable to the broken-line Fig. 7 position for breaking the charging circuit and discharging the capacitor through relay coil 71. The time constant of the discharge circuit containing relay coil 71, capacitor 72, and potentiometer 74 is made such as to maintain the relay coil energized, upon each discharging of the capacitor, for a period sufficient to permit one pressure diagram to be displayed on the oscilloscope face. More specifically, the relay is held in its broken-line position for a period equal to one cycle of the piston and cylinder mechanism (a cycle being the time required for one to-and-fro motion of the piston) to assure the passage of one and only one discharging pulse from capacitor 75 to the multivibrator through its lead 68. That one pulse which is admitted to the multivibrator through lead 68 actuates the multivibrator to a state commencing an indicating cycle of the oscilloscope. By the time the next discharging pulse is admitted to the multivibrator from capacitor 75, relay arm 70 is in its full-line position to pass that pulse through lead 66, and thus stop the indication by the oscilloscope. As a result, the oscilloscope forms a diagram representing one complete cycle of pressures upon each actuation of control switch 73. Camera 18 photographs and make a permanent record of that single cycle diagram, the camera lens being opened shortly before actuation of control switch 73 and closed after its actuation. The period of energization of relay coil 71 by discharge of capacitor 72 is regulated by adjustment of a potentiometer 74, forming a variable resistance shunt across the coil.

By means of the disclosed apparatus, it is possible to very easily and quickly make a pressure diagram of a piston and cylinder mechanism, without the necessity for any synchronization of the piston position indicating portion of the apparatus with the piston movements. When the wheel 25 of the Fig. 1 pickup unit is moved into engagement with the piston rod, potentiometer 24 commences immediately to vary the signal to the oscilloscope horizontal deflection plates in accordance with and in proportion to the displacement of the piston rod from a reference position, as from one end of its travel. At the same time, the potential to the vertical deflection plates is varied in accordance with the cylinder chamber pressure. Actuation of control switch 73 to its broken-line position then renders the oscilloscope effective for one cycle of the piston and cylinder mechanism to produce a diagram representing that cycle.

I claim:

1. Apparatus for indicating pressures of a mechanism having a cylinder and a piston assembly which reciprocates relative to the cylinder, said apparatus including a pressure responsive recorder operable to record a curve representing a cycle of said pressures, means responsive to variations in said pressures and to the piston movements, electric switch means, means frictionally engaging said reciprocating piston assembly and operable to actuate said switch means upon and as a result of reversals in the direction of movement of said piston assembly, a two-state multivibrator controlling the starting and stopping of a recording operation by said recorder, and means operable by said switch means to actuate said multivibrator for starting a recording operation on one actuation of the switch means and stopping the recording operation on a subsequent actuation of the switch means.

2. Apparatus for indicating pressures of a mechanism having a cylinder and a piston assembly which reciprocates relative to the cylinder, said apparatus including a body, a member carried by said body for rotary oscillating movement relative thereto, said member being free for movement into and out of a driven engagement with said reciprocating piston assembly and being adapted when in said engagement to be rotatably oscillated by and in accordance with the reciprocation of said piston assembly, an indicator for graphically representing said pressures including indicating means displaced along a first axis in accordance with variations in said pressures and along a second axis in accordance with and in proportion to the oscillating movement of said member by said piston assembly, control means operable by said member to maintain said displacement of the indicating means along said second axis proportional to the movement of said member, said indicator including means for recording the movements of said indicating means, electric switch means, means frictionally engaging said reciprocating piston assembly and operable to actuate said switch means upon and as a result of reversals in the direction of movement of said piston assembly, and means operable by said switch means to limit a recording operation of said indicator to a predetermined number of pressure cycles.

3. Apparatus for indicating pressures of a piston and cylinder mechanism having a reciprocating piston rod, comprising a portable body having a handle portion, a wheel mounted to said body for rotary oscillating movement relative thereto movable into and out of a frictional engagement with said piston rod and operable when in said engagement to rotatably oscillate in accordance with the reciprocation of the rod, an oscilloscope producing an image moving along a first axis in accordance with variations in said pressure and oscillating along a second axis in accordance with and in proportion to the rate of rotary movement of said wheel, a potentiometer carried by said body operable to vary a signal to the oscilloscope for controlling displacement of said image along said second axis, means connecting said potentiometer to said wheel for actuation thereby in a relation to vary said signal in proportion to the rotary movement of said wheel, a camera for photographically recording an image produced by said oscilloscope, an electric switch carried by said body, means carried by the body in frictional engagement with said rod and operable to actuate said switch upon reversals in the direction of movement of the rod, a multivibrator controlling the starting and stopping of a recording operation by said oscilloscope and camera and operable between a first state in which the camera is effective to record an image representing said pressures and a second non-recording state, and a control circuit operable by said switch to actuate said multivibrator for starting a recording operation on one actuation of the switch and stopping the recording operation on a subsequent actuation of the switch.

4. For use in combination with a piston and cylinder mechanism having a reciprocating piston assembly and an indicator for graphically representing a cycle of pressures of said mechanism; apparatus including a body, a member mounted to said body for oscillating movement relative thereto, said member being free for movement into and out of a driven engagement with said reciprocating piston assembly and being adapted when in said engagement to be oscillated by and in accordance with the reciprocation of said piston assembly, control means carried by said body and operable to vary a control signal to the indicator, and means actuating said control means in accordance with the oscillating movement of said member with said reciprocating piston assembly and in such relation as to maintain said signal proportional to the displacement of the member by said piston assembly.

5. For use in combination with a piston and cylinder mechanism having a reciprocating piston assembly and an indicator for graphically representing a cycle of pressures of said mechanism; apparatus including a body, a member mounted to said body for rotary oscillating movement relative thereto, said member being free for movement into and out of a driven frictional engagement with said reciprocating piston assembly and being adapted when in said engagement to be rotatably oscillated by and in accordance with the reciprocation of said piston assembly, control means carried by said body and operable to vary a control signal to the indicator, and means actuating said control means in accordance with the rotary oscillating movement of said member resulting from reciprocation of said piston assembly and in such relation as to maintain said signal proportional to the displacement of the member by said piston assembly.

6. For use in combination with a piston and cylinder mechanism having a reciprocating piston assembly and an indicator for graphically representing a cycle of pressures of said mechanism; apparatus including a body, a member mounted to said body for oscillating movement relative thereto, said member having a portion of friction material presenting an annular surface movable into and out of a driven engagement with said reciprocating piston assembly and being adapted when in said engagement to be rotatably oscillated by and in accordance with the reciprocation of said piston assembly, control means carried by said body and operable to vary a control signal to the indicator, and means actuating said control means in accordance with the rotary oscillating movement of said member resulting from reciprocation of said piston assembly and in such relation as to maintain said signal proportional to the displacement of the member by said piston assembly.

7. For use in combination with a piston and cylinder mechanism having a reciprocating piston assembly and an indicator for graphically representing a cycle of pressures of said mechanism; apparatus including a body, a member mounted to said body for oscillating movement relative thereto, said member being movable into and out of a driven engagement with said reciprocating piston assembly and being adapted when in said engagement to be oscillated by and in accordance with the reciprocation of said piston assembly, an electrical control unit carried by said body operable to vary an electric control signal to the indicator, and means operatively connecting said control unit to said member for actuation by and in accordance with said oscillation of said member resulting from reciprocation of said piston assembly and in a relation to maintain said control signal proportional to the displacement of said member by said piston assembly.

8. For use in combination with a piston and cylinder mechanism having a reciprocating piston assembly and an indicator for graphically representing a cycle of pressures of said mechanism; apparatus including a body, a wheel mounted to said body for rotary oscillating movement relative thereto, said wheel being free for movement into and out of a driven frictional engagement with said reciprocating piston assembly and being adapted when in said engagement to be rotatably oscillated by and in accordance with the reciprocation of said piston assembly, a potentiometer carried by said body and operable to vary an electric control signal to the indicator, and means operatively connecting said potentiometer to said wheel for oscillatory actuation thereby in accordance with said rotary oscillation of said wheel and in such relation as to maintain the control signal proportional to the rotary displacement of said wheel.

9. For use in combination with a piston and cylinder mechanism having a reciprocating piston assembly and an indicator for graphically representing a cycle of pressures of said mechanism; apparatus including a body, a member mounted to said body for movement relative thereto, said member being free for movement into and out of a driven engagement with said piston assembly and operable to move therewith when in said engagement, control means carried by said body and operable to vary a control signal to the indicator, means for actuating said control means in accordance with the movement of said member, and switch means carried by said body for controlling the period of operation of said indicator and having an actuating element engageable with said reciprocating piston assembly of the mechanism and actuable by and in accordance with reversals in the direction of movement of said piston assembly.

10. For use in combination with a piston and cylinder mechanism having a reciprocating piston assembly and an indicator for graphically representing a cycle of pressures of said mechanism; apparatus including a body, a member mounted to said body for oscillating movement relative thereto, said member being movable into and out of a driven engagement with said reciprocating piston assembly and being adapted when in said engagement to be oscillated by and in accordance with the reciprocation of said piston assembly, control means carried by said body and operable to vary a control signal to the indicator, means actuating said control means in accordance with the oscillating movement of said member with said piston assembly and in such relation as to maintain said signal proportional to the displacement of the member by said piston assembly, and a switch carried by said body for controlling the period of operation of said indicator, said switch including an actuating element frictionally engageable with said reciprocating piston assembly of the mechanism and free for limited movements relative to said body upon reversals in the direction of movement of said piston assembly, and contacts for opening and closing an electric circuit in accordance with said movements of said actuating element upon said reversals in direction of movement.

11. For use in combination with a piston and cylinder mechanism having a reciprocating piston rod and an indicator for graphically representing a cycle of pressures of said mechanism; a portable body having a handle portion, a wheel mounted to said body for rotary oscillating movement relative thereto, said wheel being movable into and out of a driven frictional engagement with said reciprocating rod and operable when in said engagement to rotatably oscillate in accordance with the reciprocation of said rod, a rotary potentiometer carried by said body for varying a control signal to said indicator, a connection between said wheel and potentiometer for rotatably oscillating the potentiometer in accordance with the oscillation of the wheel, and a switch carried by said body for controlling the period of operation of said indicator, said switch including an actuating element frictionally engageable with said reciprocating rod while the wheel is engaged thereby and free for limited lateral movements relative to the body in response to reversals in the direction of movement of said part, contacts opening and closing an electric circuit in accordance with said lateral movements of said actuating element, said element being movable toward and away from said rod, and a spring yieldingly urging said actuating element toward the rod.

12. Apparatus for indicating pressures of a mechanism having a cylinder and a piston assembly which reciprocates relative to the cylinder, said apparatus including a body, a member mounted to said body for oscillating movement relative thereto, said member being free for movement into and out of a driven engagement with said reciprocating piston assembly and being adapted when in said engagement to be oscillated by and in accordance with the reciprocation of said piston assembly, an indicator for graphically representing said pressures including indicating means displaced along a first axis in accordance with variations in said pressures and along a second axis in accordance with and in proportion to the oscillating movement of said member by said piston assembly, and control means operable by said member to maintain said displacement of the indicating means along said second axis proportional to the movement of said member.

13. Apparatus for indicating pressures of a mechanism having a cylinder and a piston assembly which reciprocates relative to the cylinder, said apparatus including a body, a member mounted to said body for rotary oscillating movement relative thereto, said member being free for movement into and out of a driven engagement with said reciprocating piston assembly and being adapted when in said engagement to be rotatably oscillated by and in accordance with the reciprocation of said piston assembly, an indicator for graphically representing said pressures including indicating means displaced along a first axis in accordance with variations in said pressures and along a second axis in accordance with and in proportion to the rotary oscillating movement of said member by said piston assembly, and control means operable by said member to maintain said displacement of the indicating means along said second axis proportional to the movement of said member.

14. Apparatus for indicating pressures of a mechanism having a cylinder and a piston assembly which reciprocates relative to the cylinder, said apparatus including a body, a member mounted to said body for oscillating movement relative thereto, said member being free for movement into and out of a driven engagement with said reciprocating piston assembly and being adapted when in said engagement to be oscillated by and in accordance with the reciprocation of said piston assembly, an oscilloscope for graphically representing said pressures and producing an image displaced along a first axis in accordance with variations in said pressures and along a second axis in accordance with and in proportion to the oscillating movement of said member by said piston assembly, and control means operable by said member to maintain said displacement of the image along said second axis proportional to the movement of said member, said control means including a unit carried by said body operable to vary an electrical control signal to the oscilloscope, and means operatively connecting said unit to said member for actuation thereby and in a relation to vary said control signal in proportion to the displacement of said member by said piston assembly.

15. Apparatus for indicating pressures of a mechanism having a cylinder and a piston assembly which reciprocates relative to the cylinder, said apparatus including a pressure responsive recorder operable to record a curve representing a cycle of said pressures, means rendering said recorder responsive to variations in said pressures and to the piston assembly movements, electric switch means, means for actuating said switch means and adapted to engage said reciprocating piston assembly and be actuated thereby upon and as a result of reversals in the direction of movement of said reciprocating piston assembly and to actuate said switch means between open and closed positions in accordance with said reversals, and means operable by said switch means to limit a recording operation by said recorder to a predetermined number of pressure cycles.

References Cited in the file of this patent

UNITED STATES PATENTS

| | | |
|---|---|---|
| 1,655,615 | Kreisel | Jan. 10, 1928 |
| 2,113,376 | Janco | Apr. 5, 1938 |
| 2,133,437 | Dodds | Oct. 18, 1938 |
| 2,190,713 | Hintze et al. | Feb. 20, 1940 |
| 2,251,976 | Brown | Aug. 12, 1941 |
| 2,298,802 | Meyerhoefer | Oct. 13, 1942 |
| 2,344,452 | Parsons | Mar. 14, 1944 |
| 2,595,425 | Thomson et al. | May 6, 1952 |